July 26, 1938. H. E. SUGGS 2,125,207
VACUUM PEANUT STONER
Filed Nov. 9, 1936
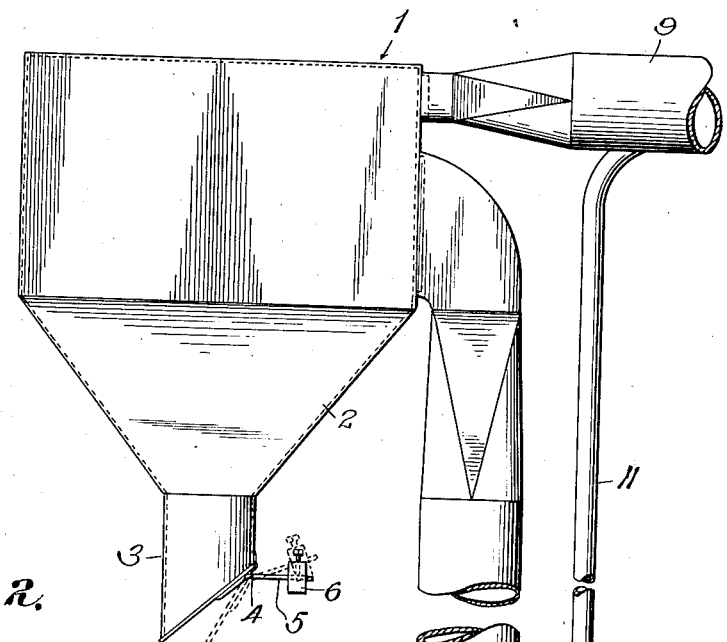
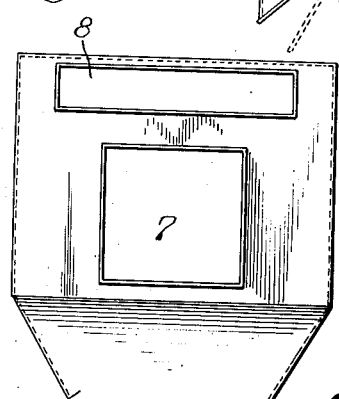
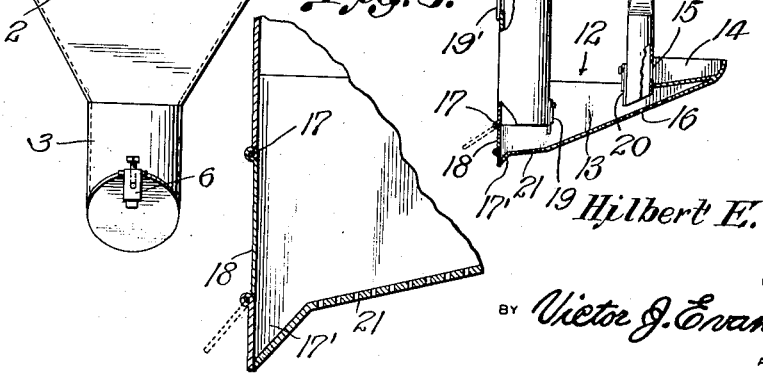
Hilbert E. Suggs
INVENTOR
BY Victor J. Evans & Co.
ATTORNEYS Patented July 26, 1938

2,125,207

UNITED STATES PATENT OFFICE 2,125,207

VACUUM PEANUT STONER

Hilbert E. Suggs, Dawson, Ga.

Application November 9, 1936, Serial No. 109,996

2 Claims. (Cl. 209—139)

This invention relates to vacuum separators especially adapted for the handling and cleaning of peanuts, and has for the primary object the provision of a device of this character which will efficiently remove stones and other foreign matter from peanuts and deliver the latter to a remotely located bin for discharge into a huller or into receptacles or containers for storage or shipment, thus eliminating the use of endless conveyors and only requiring a minimum amount of manual attention.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a front elevation, partly in section, illustrating a separator constructed in accordance with my invention.

Figure 2 is a side elevation illustrating a bin.

Figure 3 is a fragmentary vertical view showing a portion of a hopper.

Referring in detail to the drawing, the numeral 1 indicates a bin having a conical-shaped bottom 2 and terminating in a discharge neck 3. The neck 3 is controlled by a gate type valve 4, the latter having secured thereto an arm 5 on which is adjustably mounted a weight 6. The bin 1 is adapted to be located at any selected place, preferably with its discharge neck 3 arranged to direct peanuts into a huller or if desired into a collecting receptacle. One side of the bin 1 has openings 7 and 8. An air suction pipe 9 is connected to the opening 8 and connected to the opening 7 is a vertically arranged peanut conveyor pipe 10. Paralleling the pipe 10 is a suction trash conveying pipe 11 and the upper end is connected to the suction pipe 9.

Connected to the lower ends of the pipes 10 and 11 is a feeder 12 preferably in the form of superimposed hoppers 13 and 14 integrally connected with one another. The pipe 11 adjacent its lower end is provided with an opening 15 in direct communication with the hopper 14. The lower end of the pipe 11 is spaced from the bottom of the hopper 13 and the bottom wall of said hopper directly under said pipe 11 has perforations 16. The hopper 13 extends under the lower end of the pipe 10 and has an outlet 17 and a trough 17' adjacent thereto. A gate 18 including hingedly connected sections is hinged to the pipe 10 for closing the outlet 17 and one section thereof forms a movable wall for the trough so that when foreign matter has accumulated in the trough the said section may swing under the weight of said foreign matter and permit the latter to gravitate from the trough. Should peanuts and foreign matter accumulate too rapidly under the receiving end of the pipe 10 and faster than the pipe can convey said peanuts to the bin 1, the gate 18 will swing open and free the surplus peanuts and foreign matter for gravitation out of the hopper 13. Slides 19 and 20 are secured to the pipes 10 and 11 and are adjustable relative to the bottom wall of the hopper 13 for regulating the flow of peanuts and heavy foreign matter to the hopper 13 and under the pipe 10 to prevent a large accumulation of the same which would cause peanuts to become lodged within the heavy foreign matter or between the stones and discharged therewith through the gate. The bottom wall of the hopper directly under the pipe 10 is perforated, as shown at 21.

An opening 18' is provided in the pipe 10 and is controlled by a slide 19' whereby the air suction in the pipe 10 at the receiving end thereof may be increased and decreased.

In operation, suction is developed in the pipe 9 in any suitable way. This suction acts to draw air through the pipe 11, pipe 10 by way of the bin 1. The peanuts containing foreign matter such as dirt, stones and trash are deposited in the hopper 14 and pass therefrom into the lower end of the pipe 11. The pipe 11 having the suction therein will elevate trash lighter than the peanuts and stones so that said trash will be conveyed to the suction pipe 9 for discharge in any suitable way at a remote place. The peanuts, stones and other heavy foreign matter pass downwardly into the hopper 13 from the pipe 11, the dirt sifting through the perforations 16. The bottom of the hopper 13 inclines towards the lower end of the pipe 10 so that the peanuts with the foreign matter heavier than said peanuts pass directly under the pipe 10. The suction in the pipe 10 elevates the peanuts and deposits them in the bin 1 and when sufficient peanuts have accumulated in the bin to open valve 4, said peanuts then discharge to the huller or other device located under said bin. The stones and heavier materials fall in the trough and escape therefrom by the gate 18 or one section thereof opening under the weight of the stones and heavy foreign matter.

A device of the character described is capable of removing foreign matter from peanuts rapidly and to deposit the peanuts in the bin located at some remote place from the hoppers so that said peanuts when accumulated in sufficient amount will pass into a huller or some other suitable device.

Having described the invention, I claim:

1. A separator for removing foreign matter from peanuts comprising a bin, a suction pipe connected to said bin, superimposed hoppers remotely located with respect to the bin, a trash conveying pipe connected to the suction pipe and extending into the lowermost hopper and having an open end in proximity to the bottom of said lowermost hopper, said trash conveying pipe formed with a passage communicating with the uppermost hopper above the open end of the trash conveying pipe for admitting peanuts mixed with trash into said trash conveying pipe from said uppermost hopper in a manner whereby suction developed in said pipe raises trash of a lighter weight than said peanuts upwardly into said suction pipe and permits said peanuts and remaining trash to discharge through the open end of said trash conveying pipe into said lowermost hopper, a peanut conveying pipe connected to said bin and in communication with said suction pipe whereby to develop suction within said peanut conveying pipe, said peanut conveying pipe extending into said lowermost hopper and having an open end in proximity to the bottom of said lowermost hopper for subjecting peanuts discharged thereunder from said trash conveying pipe to the influence of suction developed in said peanut conveying pipe whereby said peanuts are conveyed through said peanut conveying pipe into said bin, said lowermost hopper fashioned with a discharge port adjacent the open end of said peanut conveying pipe, and a gate swingably engaging said lowermost hopper for closing said port and operable to open said port for the discharging of trash therethrough by the weight of the trash accumulated under said peanut conveying pipe.

2. A separator for removing foreign matter from peanuts comprising a bin, a suction pipe connected to said bin, superimposed hoppers remotely located with respect to the bin, a trash conveying pipe connected to the suction pipe and extending into the lowermost hopper and having an open end in proximity to the bottom of said lowermost hopper, said trash conveying pipe formed with a passage communicating with the uppermost hopper above the open end of the trash conveying pipe for admitting peanuts mixed with trash into said trash conveying pipe from said uppermost hopper in a manner whereby suction developed in said pipe raises trash of a lighter weight than said peanuts upwardly into said suction pipe and permits said peanuts and remaining trash to discharge through the open end of said trash conveying pipe into said lowermost hopper, a peanut conveying pipe connected to said bin and in communication with said suction pipe whereby to develop suction within said peanut conveying pipe, said peanut conveying pipe extending into said lowermost hopper and having an open end in proximity to the bottom of said lowermost hopper for subjecting peanuts discharged thereunder from said trash conveying pipe to the influence of suction developed in said peanut conveying pipe whereby said peanuts are conveyed through said peanut conveying pipe into said bin, the bottom of said lowermost hopper fashioned with an inclined section extending from said uppermost hopper downwardly towards said peanut conveying pipe whereby peanuts and trash discharged from said trash conveying pipe gravitate under said open end of said peanut conveying pipe, and an adjustable slide transversing said lowermost hopper above the bottom thereof for controlling the quantity of peanuts and trash passing under the open end of said peanut conveying pipe.

HILBERT E. SUGGS